(12) United States Patent
Wegelin et al.

(10) Patent No.: US 7,201,786 B2
(45) Date of Patent: Apr. 10, 2007

(54) DUST BIN AND FILTER FOR ROBOTIC VACUUM CLEANER

(75) Inventors: Jackson Wegelin, Akron, OH (US); Ron Stephens, Rittman, OH (US); Chuck Damman, Stow, OH (US)

(73) Assignee: The Hoover Company, North Canton, OH (US)

( * ) Notice: Subject to any disclaimer, the term of this patent is extended or adjusted under 35 U.S.C. 154(b) by 174 days.

(21) Appl. No.: 10/739,314

(22) Filed: Dec. 19, 2003

(65) Prior Publication Data

US 2005/0132680 A1 Jun. 23, 2005

(51) Int. Cl.
*B01D 45/04* (2006.01)
*B01D 46/10* (2006.01)
*A47L 9/10* (2006.01)

(52) U.S. Cl. .............. 55/429; 55/301; 55/357; 55/385.1; 55/418; 55/433; 55/462; 55/467; 55/482; 55/487; 55/497; 55/503; 55/521; 55/DIG. 3; 15/347; 15/352; 15/353

(58) Field of Classification Search .......... 55/282, 55/301, 356, 357, 385.1, 418, 429, 433, 447, 55/462, 467, 473, 486, 487, 482, 495, 499, 55/503, 521, DIG. 3; 15/347, 350, 352, 15/353, DIG. 8
See application file for complete search history.

(56) References Cited

U.S. PATENT DOCUMENTS

| | | | | |
|---|---|---|---|---|
| 4,426,211 A | * | 1/1984 | Ataka et al. | 55/429 |
| 5,659,922 A | * | 8/1997 | Louis | 15/352 |
| 5,935,279 A | * | 8/1999 | Kilstrom | 55/429 |
| 5,970,575 A | * | 10/1999 | Lee | 15/352 |
| 6,256,834 B1 | * | 7/2001 | Meijer et al. | 55/429 |
| 6,387,141 B1 | * | 5/2002 | Hollingsworth et al. | 55/487 |
| 6,436,160 B1 | * | 8/2002 | Stephens et al. | 55/429 |
| 6,615,444 B2 | * | 9/2003 | McGilll et al. | 55/DIG. 3 |
| 2003/0060928 A1 | | 3/2003 | Abramson et al. | |
| 2003/0131441 A1 | * | 7/2003 | Murphy et al. | 15/352 |
| 2003/0145419 A1 | * | 8/2003 | Park et al. | 15/352 |
| 2004/0010885 A1 | * | 1/2004 | Hitzelberger et al. | 15/352 |
| 2004/0148914 A1 | * | 8/2004 | Lim et al. | 55/429 |
| 2005/0015920 A1 | * | 1/2005 | Kim et al. | 15/352 |

* cited by examiner

*Primary Examiner*—Jason M. Greene
(74) *Attorney, Agent, or Firm*—Connoly Bove Lodge & Hutz LLP

(57) ABSTRACT

A detachable dust bin for a vacuum cleaner. A container is provided with a removable sidewall which has an outlet opening which is adapted to be coupled to a source of vacuum. The container includes an inlet for connecting to a passageway which is connected to a vacuum nozzle. A duct extends vertically from the inlet within the container, and then laterally toward the removable sidewall. A filter is supported along the removable sidewall having a front surface facing the outlet of the duct, and a rear surface facing the outlet opening in the removable sidewall. Dirt laden air is drawn through the filter, duct, and vacuum nozzle. Dirt is separated from the air and collected within the container.

16 Claims, 2 Drawing Sheets

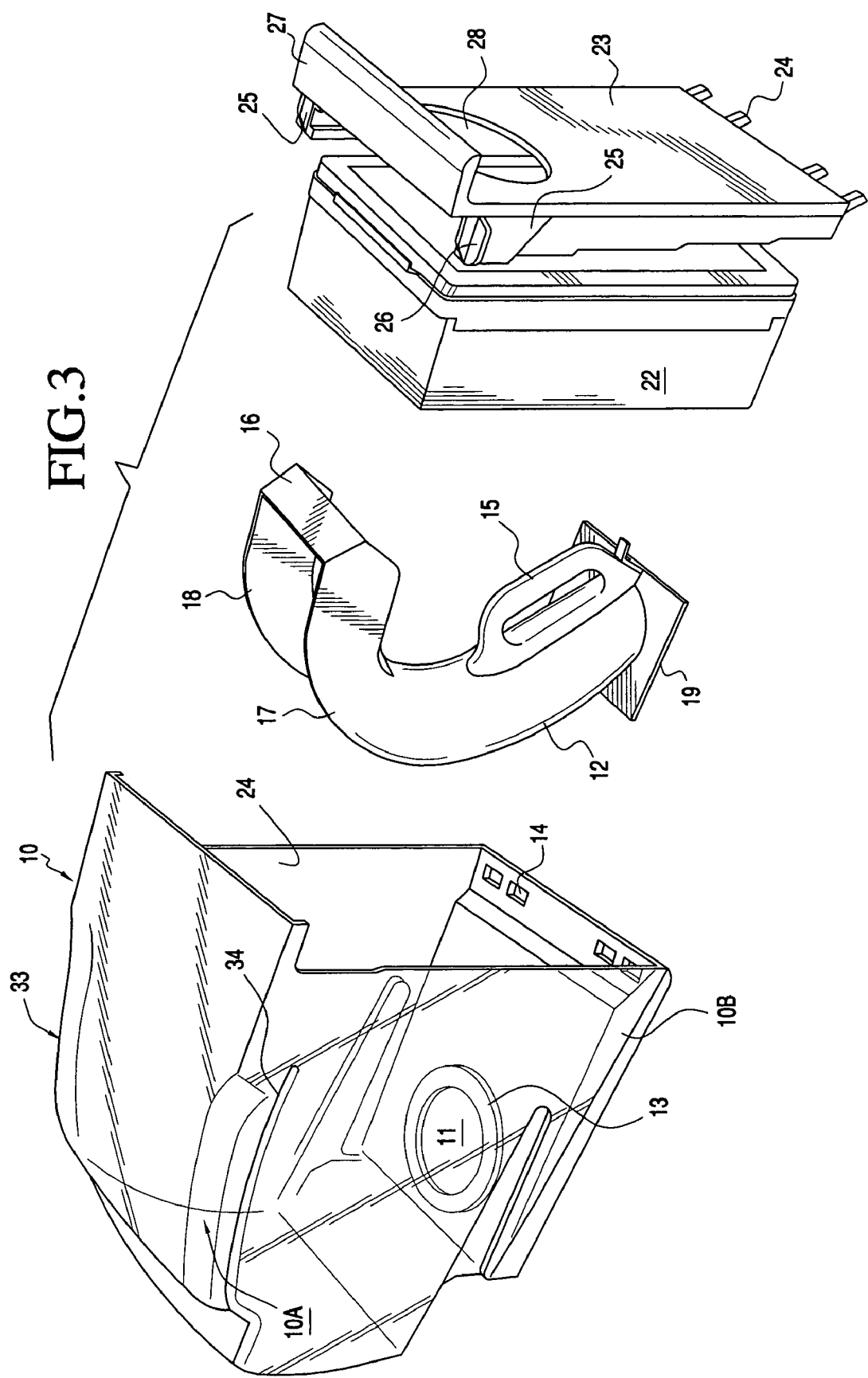

DUST BIN AND FILTER FOR ROBOTIC VACUUM CLEANER

The present invention relates to vacuum cleaners in general, and in particular to autonomous vacuum cleaners. Specifically, a dust bin is provided for collecting dirt particles from a vacuum cleaner nozzle of an autonomous vacuum cleaner.

Conventional vacuum cleaners remove dirt from floor surfaces by applying a vacuum through a nozzle to the floor surface. The dirt particles collected through the vacuum nozzle has usually been passed through a filter bag that removes particle material contained in the air stream from the air while maintaining the air flow through the vacuum system.

Autonomous vacuum cleaners which navigate over a surface in accordance with a stored program, such as that shown in published U.S. patent application Ser. No. US2003/0060928A1, assigned to the Friendly Robotics Company, are battery operated and may generate a low level of suction force. Designing a dust bin that can achieve an acceptable level of sustained performance to be usable with the lower initial suction force is the issue. Accordingly, a vacuum cleaner dust bin has been proposed as shown in the aforesaid U.S. patent which is contained within the autonomous vehicle while the vehicle is traversing a surface to be cleaned. The vacuum force is applied to an outlet of the dust bin, and an air stream is established through an inlet of the dust bin which is connected to a vacuum nozzle. A filter within the dust bin filters dirt laden air flowing through the dust bin inlet. The dust bin and filter assembly is removed from the vacuum cleaner for emptying the collected dirt particles.

The dust bin and filter assembly is desirably implemented such that the airflow is not perpendicular to the prefilter surface such that the kinetic energy of the air passing parallel to the filters keeps the filters free of clogs and reduces the frequency of cleaning.

The dust bin assembly must also be ergonomically acceptable to users. When in use, it must be maintained within the vacuum cleaner and, during removal from the vacuum cleaner, be easily emptied without inadvertently spilling its contents.

The present invention provides for an improved dust bin structure that meets these requirements.

SUMMARY OF THE INVENTION

The present invention provides a detachable dust bin for collecting dirt from a vacuum cleaner nozzle. The container includes an inlet at the bottom for communicating with the vacuum passageway leading to the vacuum cleaner nozzle. A duct extends vertically from the inlet, and then extends towards a sidewall. The sidewall has an opening forming an outlet for air flowing from the inlet. An air filter is supported between the sidewall and the duct. A vacuum is drawn through the sidewall opening, filter, duct and inlet, thereby forcing particle laden air from the surface being cleaned into the container.

The foregoing structure is advantageously arranged so that the dirt laden air exits the duct at an angle to the filter. The bulk of the filtered dirt particles collect within the dust bin, as the component of the air velocity parallel to the surface of the filters acts to keep an area of the filter face free of debris and thus allows continued air flow. The container is periodically removed from the vacuum cleaner, and the sidewall is removed to empty the contents of the container as well as to clean and/or replace the filter.

DESCRIPTION OF THE FIGURES

FIG. 3 is an exploded view of the dust bin of FIG. 1.

DESCRIPTION OF THE PREFERRED EMBODIMENT

Figure 1:
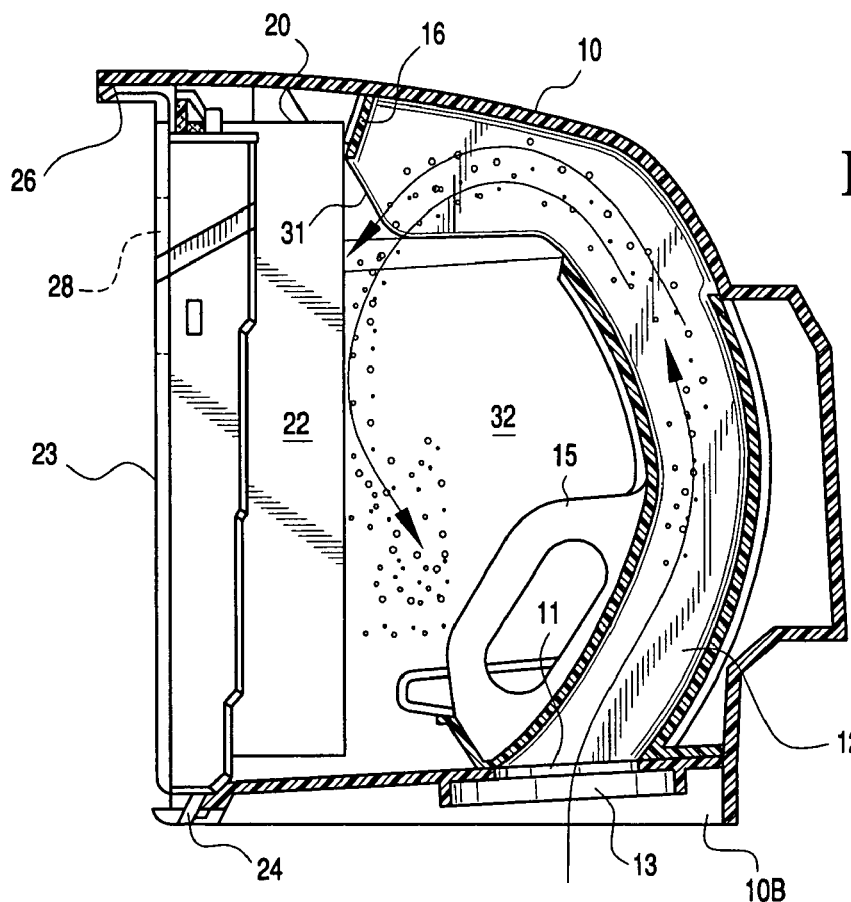
FIG. 1 is section view of a dust bin which is in accordance with the preferred embodiment of the invention.
Figure 2:
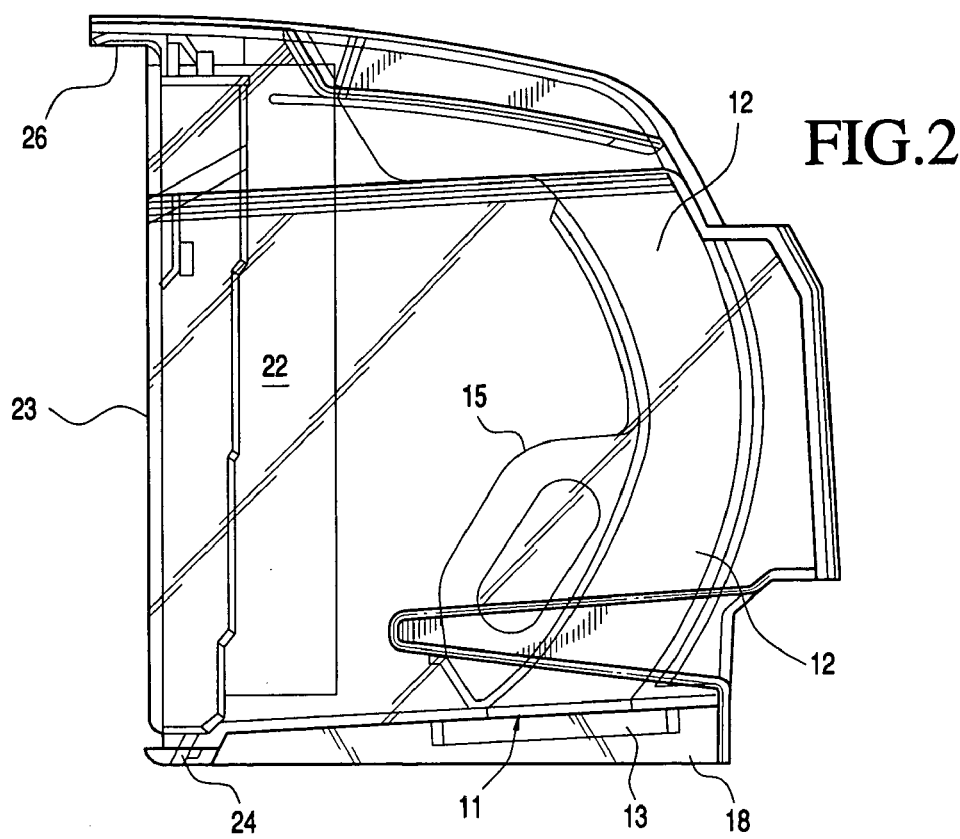
FIG. 2 is a plain view of the dust bin of FIG. 1.

FIGS. 1–2 illustrate, respectively, the plan view and section view of the preferred embodiment of the dust bin as it sits within an autonomous vacuum cleaner. A container 10 is shown having a generally rectangular cross section, and may be made of acrylic or transparent/translucent material. An inlet 11 of the dust bin is formed on a recessed base 10b. The recessed base has an opening which includes a seal 13 which forms a connection to a passageway (not shown) connected to a vacuum cleaner nozzle. A source of vacuum is applied against outlet 28 when the dust bin 10 is located within its compartment of the autonomous vacuum cleaner, and a vacuum is drawn through outlet 28, filter 22, duct 12 and inlet 11.

Air laden with dirt enters the inlet 11, and travels through duct 12 which has an outlet 31 positioned in front of filter 22. The duct outlet 13 has a cross section plane which faces the filter assembly 22 at an angle. The dirt laden air exiting the duct 12 has a trajectory which is at an angle to the inlet surface of filter 22. The dirt laden air 32 thereby strikes the surface of filter 22 at an angle. The angular trajectory of the air stream to the inlet surface of the filter tends to remove particles 32 from the surface of the filter 22 where it is separated from the air stream. Most of the dirt particles contained in the air stream are deposited within the container, but a portion of the particle material, however, accumulates on the filter inlet surface.

The effects of this accumulation are more pronounced in an autonomous vacuum cleaner which is battery operated and generates a lower level of vacuum for cleaning. Build up of dirt along the filter surface reduces the available vacuum force for the vacuum nozzle, and it is necessary to clean the filter surface. The frequency of filter cleaning can be reduced if the air flow moving through the filters can also be used to keep the filter clean.

The entire container 10 is removable from the vacuum cleaner. The width 33 of the upper surface portion of the container 10 may be slightly reduced as shown in FIG. 3, forming a ledge 34 with the bottom surface of the container 10. The reduced width portion will permit grasping of the dust bin during insertion and removal from the autonomous vacuum cleaner. Once the container is removed from the vacuum cleaner, the sidewall 23 can be removed, along with the filter element 22 for cleaning.

The exploded view of FIG. 3 illustrates more particularly how each of the internal elements; including filter 22 and duct 12, can be removed from container 10. The removable sidewall 23 has a plurality of extending tabs 24 which engage opening 14 in the bottom of the container 10. Filter 22 may be a conventional filter assembly including a pre-filtering screen and replaceable fiber insert The filter 22 is held between two lateral support 25 of the sidewall 23. A handle 27 integral to the sidewall 23 permits the easy grasping and removing of the sidewall 23 by first disengaging laterally extending tabs 26 from container 10, and then pulling the handle 27 vertically. The filter 22 and sidewall 23 assembly can be separated once the sidewall 23 is removed. The filter media may advantageously be pleated and include a pore size which decreases from the top to the bottom which facilitates the trapping of larger particles near the top and smaller particles near the bottom. The filter media may also include multiple layers (3 being most advantageous) of decreasing pore size.

Duct 12 includes a base 19 which fits over the inlet 11. The back surface 10A of the container 10 forms a channel with the duct 12 sidewalls 17 and 18. By placing the duct 12 within container 10, so that the channel is formed between sidewall 10A and edges 17 and 18 of duct 12, base 19 of the duct 12 is correctly positioned with respect to the inlet 11. Due to surface 16, the plane of the outlet of the duct makes an angle with the filter 22 surface which generally helps direct the air at an angle to the filter assembly 22. A handle 15 facilitates removing and inserting the duct 12 within container 10 to empty the cup.

The foregoing container structure, while advantageous for autonomous vacuum cleaning applications, may also find use in other products of vacuuming devices.

The foregoing description of the invention illustrates and describes the present invention. Additionally, the disclosure shows and describes only the preferred embodiments of the invention in the context of vacuum cleaners in general, and in particular to autonomous vacuum cleaners, but, as mentioned above, it is to be understood that the invention is capable of use in various other combinations, modifications, and environments and is capable of changes or modifications within the scope of the inventive concept as expressed herein, commensurate with the above teachings and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form or application disclosed herein. Also, it is intended that the appended claims be construed to include alternative embodiments.

What is claimed is:

1. A detachable dust bin for collecting dirt from a vacuum cleaner nozzle comprising:
   a container having a removable side wall for emptying the contents of said container, said container including an inlet in a bottom of the container;
   a sealing connection located on an exterior of said inlet for sealing said inlet to a passageway communicating with said vacuum cleaner nozzle;
   a duct including a vertical portion extending vertically from said inlet and a lateral portion extending laterally from the vertical portion towards said removable side wall; and
   a filter supported along said removable side wall facing an outlet end of said lateral portion, said filter facing an opening in said side wall which communicates with a source of vacuum pressure whereby dirt laden air from said vacuum nozzle is drawn through said duct into said container.

2. The detachable dust bin according to claim 1 further comprising:
   a pre-filter screen between said filter and said outlet end of said lateral portion.

3. The detachable dust bin according to claim 1 wherein said outlet end of said lateral portion has a plane which is directed at an angle to a plane of said filter.

4. The detachable dust bin according to claim 1 wherein said container has a generally rectangular cross section and includes a narrow top portion to facilitate removal from a vacuum cleaner.

5. The detachable dust bin according to claim 1 wherein said duct includes a base which connects to said inlet formed in said bottom.

6. The detachable dust bin according to claim 1 wherein said filter is detachably supported to said removable side wall.

7. The detachable dust bin according to claim 3 wherein the angle is an acute angle to said filter.

8. The detachable dust bin according to claim 1 wherein said duct includes a handle for removing said duct from said container.

9. A detachable dust bin for collecting dust from a vacuum cleaner nozzle comprising:
   a container having a generally rectangular cross section, said container having a recessed bottom and a top portion of reduced width to facilitate grasping of the container, said bottom including an inlet having a seal for connecting to a passageway leading to a said vacuum cleaner nozzle, said container including a removable side wall to facilitate emptying of dirt particles collected in said container;
   an outlet formed in a wall of said container for communicating with a source of vacuum;
   a filter in communication with said outlet; and
   a detachable duct forming a channel for conveying dirt laden air from said inlet to said filter, said duct and filter being removable through said removable sidewall for cleaning.

10. The dust bin according to claim 9 wherein said detachable duct has first and second edges which forms, with a surface of said container, said channel.

11. The dust bin according to claim 9 wherein said detachable duct includes a base which positions said duct with respect to said inlet, and has a handle for grasping said duct to remove and replace it during cleaning.

12. The dust bin according to claim 9 wherein said duct has an outlet which forms an angle with the plane of said filter.

13. The dust bin according to claim 9 wherein said filter is supported on said detachable wall.

14. A detachable dust bin for collecting dirt from a vacuum cleaner nozzle comprising:
   a dust container for collecting debris, said container including an inlet in a bottom of the container;
   a duct including a vertical portion extending vertically from said inlet and including a lateral portion extending laterally from the vertical portion towards a removable side wall of the container; and
   a filter media supported along said removable side wall facing an outlet end of said lateral portion, said filter media having decreasing pore size from top to bottom so larger particles are trapped in a top of the media and smaller particles are trapped lower in the media.

15. The dust bin according to claim 14, wherein said filter media further comprises at least 3 layers of decreasing pore size.

16. The dust bin according to claim 15, wherein said filter media further comprises a pleated filter media.

* * * * *